US012663392B2

(12) United States Patent
Meira Pereira et al.

(10) Patent No.: US 12,663,392 B2
(45) Date of Patent: Jun. 23, 2026

(54) DEVICE FOR MEASURING THERMAL CONDUCTIVITY

(71) Applicants: PETRÓLEO BRASILEIRO S.A.-PETROBRAS, Rio de Janeiro (BR); UNIVERSIDADE FEDERAL DO ESPÍRITO SANTO—UFES, Vitória (BR)

(72) Inventors: Luiz Octavio Meira Pereira, Rio de Janeiro (BR); Anselmo Frizera Neto, Vitória (BR); Arnaldo Gomes Leal, Jr., Vitória (BR); Renan Costa Lazaro, Vitória (BR)

(73) Assignees: PETRÓLEO BRASILEIRO S.A.—PETROBRAS, Rio de Janeiro (BR); UNIVERSIDADE FEDERAL DO ESPÍRITO SANTO—UFES, Vitória (BR)

( * ) Notice: Subject to any disclaimer, the term of this patent is extended or adjusted under 35 U.S.C. 154(b) by 329 days.

(21) Appl. No.: 18/447,996

(22) Filed: Aug. 10, 2023

(65) Prior Publication Data

US 2024/0060918 A1 Feb. 22, 2024

(30) Foreign Application Priority Data

Aug. 11, 2022 (BR) ...................... 10 2022 015905 0

(51) Int. Cl.
*G01N 25/18* (2006.01)
*G01K 11/3206* (2021.01)
(52) U.S. Cl.
CPC ......... *G01N 25/18* (2013.01); *G01K 11/3206* (2013.01)

(58) Field of Classification Search
None
See application file for complete search history.

(56) References Cited

U.S. PATENT DOCUMENTS

| | | | |
|---|---|---|---|
| 6,465,799 B1 * | 10/2002 | Kimble | ................. G02B 5/208 |
| | | | 250/455.11 |
| 8,177,424 B2 | 5/2012 | Hampson et al. | |
| 11,125,945 B2 | 9/2021 | Anderson et al. | |

(Continued)

FOREIGN PATENT DOCUMENTS

BR 102014003069 B1 4/2016

OTHER PUBLICATIONS

Marques et al., 2015, Corrosion Resistant FBG-Based Quasi-Distributed Sensor for Crude Oil Tank Dynamic Temperature Profile Monitoring, Sensors, 15:30693-30703.

(Continued)

*Primary Examiner* — Erica S Lin
(74) *Attorney, Agent, or Firm* — Knobbe, Martens, Olson & Bear, LLP

(57) ABSTRACT

The present invention relates to a device for measuring thermal conductivity comprising at least two fiber optics, at least one encapsulation, in which the first fiber optic comprises at least one section with an etched Bragg grating and is configured as a temperature measurement sensor. The second fiber optic comprises at least one section doped with calcium oxide nanoparticles, wherein the second fiber optic is configured as a thermal conductivity measurement sensor. Encapsulation involves at least one section with an etched Bragg grating and at least one section doped with calcium oxide nanoparticles.

14 Claims, 3 Drawing Sheets

(56)                    References Cited

U.S. PATENT DOCUMENTS

2004/0109228 A1 * 6/2004 Aronstam ............. G01D 5/353
                                                              359/341.3
2006/0291203 A1 * 12/2006 Anandan ............. G02B 6/0068
                                                              257/E33.071
2017/0167899 A1 * 6/2017 Amezcua-Correa ........................
                                                              G01D 5/35351
2021/0356333 A1 * 11/2021 LeBlanc ............. E21B 49/0875

OTHER PUBLICATIONS

Matjsec et al., 2016, All-optical, all-fiber, thermal conductivity
sensor for identification and characterization of fluids, Sensors and
Actuators B: Chemical, http://dx.doi.org/10.1016/j.snb.2016.11.
084, 23 pp.
Novikova et al., 2020, Research for Methods for Creation of Hot
Wire Thermal Anemometer, Scientific and Technical Bulletin of
Information Technologies, Mechanics and Optics, 20(4):500-506
with machine translation.
White et al., 1988, An optical fiber thermal conductivity sensor,
Optical Fiber Sensors, vol. 2 of OSA Technical Digest Series, paper
FFF5, 5 pp.

* cited by examiner

DEVICE FOR MEASURING THERMAL CONDUCTIVITY

FIELD OF THE INVENTION

The present invention pertains to the technical field of operations in the oil and gas industry and, specifically, a device for measuring thermal conductivity of fluids.

BACKGROUND OF THE INVENTION

The primary processing of oil is a highly relevant operation in the oil and gas industry.

In this sense, in the primary processing of oil extracted from wells, it is separated from the other components present in the produced fluid, such as: water, suspended solids, and large amounts of flammable gases, such as natural gas.

Therefore, it is important to consider that instrumentation in crude oil storage and handling tanks or transmission lines for monitoring parameters can be a critical task because, when flammable gases come into contact with an ignition source, there is a risk of explosions and fire. Therefore, it is necessary to follow the operating restrictions in classified areas. In this way, the instrumentation devices used for monitoring parameters, such as temperature and thermal conductivity, have several limitations.

The limitations of instrumentation devices in oil tanks are due to the fact that sparks and electric arcs generated by the electronic sensors used can act as sources of ignition for flammable gases.

In view of the disclosure above, to avoid the risk of fire and explosion, parameters such as thermal conductivity are commonly measured from the collection of fluid samples, which can generate uncertainties in the measurements performed, due to the relation between thermal conductivity and temperature. In addition, the measurement by sample collection transforms the operation into a time-consuming process, since the sample collected in the oil tank must be taken to laboratories specially prepared to properly perform the same. In addition to oil quality analysis, the thermal conductivity measurements directly in the crude oil tank can be used to estimate other parameters, such as salinity and oil-water interface level in the tank, attributing to a single sensor probe the ability to obtain reliable multiparametric data.

The aforementioned relation between thermal conductivity and temperature occurs because the process of heat transfer is called thermal conduction, wherein the particles in a region with a higher temperature transfer their thermal agitation to the particles in a neighboring region with a lower temperature; thus, the measurement of thermal conductivity is based on how much the analyzed material can conduct heat.

In this way, the methods of measuring thermal conductivity can be divided according to their operating regime, namely: steady-state regime and transient regime.

The steady-state regime techniques are considered mathematically simpler, as they act with the temperature difference between two different points of the sample. Although mathematically simpler, the challenge of steady-state regime thermal sensors lies in the difficulty of stabilizing the boundary conditions, such as different temperatures and heat fluxes present in the system.

The transient regime methods were developed in order to overcome the aforementioned steady-state regime challenges. Despite having more complex mathematical models, the lack of a thermally static system reduces the measurement time to a few seconds.

Among the conventional transient regime techniques, the most commercially exploited for the evaluation of thermal conductivity are the TPS (Transient Plane Source) technique and the THW (Transient Hot Wire) technique. The TPS technique is based on a flat disk, called a hot disk, electrically insulated, surrounded by two identical samples of material and, when the disk is electrically powered, the disk acts both as a heat source and as a resistive temperature sensor. In the THW technique, a continuous amount of thermal power is generated and inserted into the sample through a hot wire. Then, a temperature sensor is positioned parallel to the hot wire and the thermal conductivity value is obtained from the temperature measured in the sample, as a function of time.

However, although the aforementioned techniques allow the measurement of thermal conductivity in the most varied types of materials, its application is not yet possible in classified areas.

The measurement of thermal conductivity directly in crude oil tanks would allow, for example, to differentiate fluids that are passing through a given polyduct, such as gasoline, diesel and oil, since different liquids have different values of thermal conductivity. With the determination of the fluid and its thermal conductivity, it is also possible to determine the flow rate of this fluid and estimate other parameters, such as salinity and level of oil-water interface in the tank. Consequently, a single sensor probe would have the capability of measuring multiple parameters.

Given the context described, to follow the restrictions of classified areas and overcome the limitations related to the measurement of thermal conductivity directly in crude oil storage and processing tanks, the instrumentation must be carried out with robust sensors, intrinsically safe, resistant to corrosion, immune to electromagnetic interference, capable of withstanding high levels of pressure and temperature, chemically resistant to hostile environments, with low production cost, and with long maintenance intervals.

Thus, solutions based on purely optical sensors are being widely explored, as, in addition to being intrinsically safe because they do not use electrical signals at the measurement points, they are compact, flexible, immune to electromagnetic interference, resistant to high temperatures (greater than 1000° C.), chemically stable, and do not corrode.

It is noted that approaches such as March-Zender interferometer, Fabry-Perot interferometer, and fiber Bragg gratings are commonly used in the development of various sensors, such as level sensors, temperature, pressure, torsion, density, among others. Specifically, sensors using Bragg gratings, in addition to the already known advantages related to fiber optic sensors, have been widely used due to their manufacturing simplicity and multiplexing capability.

Therefore, there is a need for a device to perform the measurement of thermal conductivity in places containing flammable fluids, such as classified areas, in a completely safe way; that is, without exposing the environment to risk of fire or explosion. For this, the device must be, for example, capable of converting optical power into thermal power, enabling thermal monitoring in the primary processing of the oil in the most diverse storage tanks, production tanks, onshore or offshore three-phase separators, in handling crude oil, or in transmission lines.

STATE OF THE ART

In the state of the art, there are devices designed to measure parameters for thermal monitoring. However, these devices have shortcomings related to the measurement of thermal conductivity in classified areas.

The patent document U.S. Pat. No. 11,125,945B2 discloses a sensor system comprising a fiber optic, an optical assembly to transmit light to the fiber optic and detect light received from the fiber optic, and an electronic circuit that communicates with the optical assembly to characterize the temperature at multiple points along a length of fiber optic.

The patent document BR102014003069B1 refers to a transducer used for temperature monitoring in bearings and radiators of electric generators. The transducer uses a ceramic rod and a computer equipped with software to acquire measurements.

Additionally, the patent document U.S. Pat. No. 8,177, 424B2 discloses an apparatus for use in piping and a sensor device that are characterized in that the length of the fiber optic is long to provide point temperature measurements as part of a temperature measurement system.

Similarly, the document published as a paper "CORROSION RESISTANT FBG-BASED QUASI-DISTRIBUTED SENSOR FOR CRUDE OIL TANK DYNAMIC TEMPERATURE PROFILE MONITORING" describes an optical temperature sensor based on Bragg grating (FBG) resistant to corrosion, maneuverable and intrinsically safe.

The document published as a paper "RESEARCH FOR METHODS FOR CREATION OF HOT WIRE THERMAL ANEMOMETER OF FIBER OPTICS" describes a device with two fiber optics, wherein the first with a Bragg grating in the core was used to transmit an information signal, and the other was used to create a hot wire.

In turn, the document published as a paper "AN OPTICAL FIBER THERMAL CONDUCTIVITY SENSOR" describes that the determination of the thermal conductivities of liquids can be performed using a variation of the transient hot wire technique, in which an interferometer of Mach-Zehnder is employed to measure the temperature change of a short length of fiber optic.

Finally, the document published as a paper "ALL-OPTICAL, ALL-FIBER, THERMAL CONDUCTIVITY SENSOR FOR IDENTIFICATION AND CHARACTERIZATION OF FLUIDS" presents a fiber optic thermal conductivity sensor consisting of a small section of highly absorbent fiber, which was configured as a Fabry-Perot interferometer.

As can be seen from the description of the documents of the State of the Art indicated above, there are fiber optic sensor devices with Bragg gratings that perform temperature measurement. In addition, there are devices that, in addition to measuring temperature, measure thermal conductivity using the hot wire technique. However, such devices do not disclose or suggest the measurement of thermal conductivity being carried out directly in classified areas, such as oil tanks, gas pipelines and polyducts.

Therefore, a device is needed to perform the measurement of thermal conductivity in classified areas, so that this measurement can be made directly in tanks or other means with flammable fluids in a completely safe way; that is, without exposing the environment to the risk of fire. This solution can be found with a device that is capable of converting optical power into thermal power, thus enabling thermal monitoring in primary processing in the oil and gas industries and, specifically, the measurement of temperature and thermal conductivity.

BRIEF DESCRIPTION OF THE INVENTION

The present invention defines, according to a preferred embodiment, a device for measuring thermal conductivity comprising at least two fiber optics and at least one encapsulation. The first fiber optic comprises at least one section with an etched Bragg grating and is configured as a temperature measurement sensor. The second fiber optic comprises at least one section doped with calcium oxide nanoparticles and is configured as a thermal conductivity measurement sensor. Thus, the encapsulation involves at least one section with an etched Bragg grating and at least one section doped with calcium oxide nanoparticles.

One of the advantages of the present invention compared to the State of the Art is due to the fact that the proposed device works with sensors, which allow temperature and thermal conductivity measurements to be carried out directly in the primary oil processing reservoir, or even in transmission lines, safely and without the need to collect samples for later measurements, reducing operating costs.

In addition, another advantage of the device of the present invention is that it requires a small number of elements in its assembly, has no moving or complex parts, and is flexible. These features allow a reduction in the risk of failure and customization for different operating conditions, in addition to the ability to use the sensor for other purposes, such as salinity measurement and fluid identification.

Additionally, another advantage of the device of the present invention is characterized in that its elements are resistant to oil, having proven capacity to operate with more than 90% of average accuracy. The device includes at least one section of fiber optic that acts similarly to a non-resistive hot wire and at least one non-electronic temperature sensor, ideal for flammable fluid applications. In this way, the technology of the device of the invention is adapted for classified areas and has the potential to reduce the exposure of workers to risks, by reducing the need to collect samples of water and oil from the tanks to carry out the measurements.

Complementarily, the device of the present invention benefits the environment, as the improvement of the instrumentation of the tanks can be applied to increase the efficiency of the processing of crude oil, being an operation without environmental impact; that is, without potentially polluting elements. In contrast, taking samples for laboratory analysis causes the consumption of chemical components, which need to be discarded at the end of the operation.

BRIEF DESCRIPTION OF FIGURES

In order to complement the present description and obtain a better understanding of the features of the present invention, and according to a preferred embodiment thereof, in the attachment, a set of figures is presented, in which, as an example, although not limiting, its preferred embodiment is represented.

DETAILED DESCRIPTION OF THE INVENTION

The device for measuring thermal conductivity, according to a preferred embodiment of the present invention, is described in detail, based on the attached figures.

Figure 1:
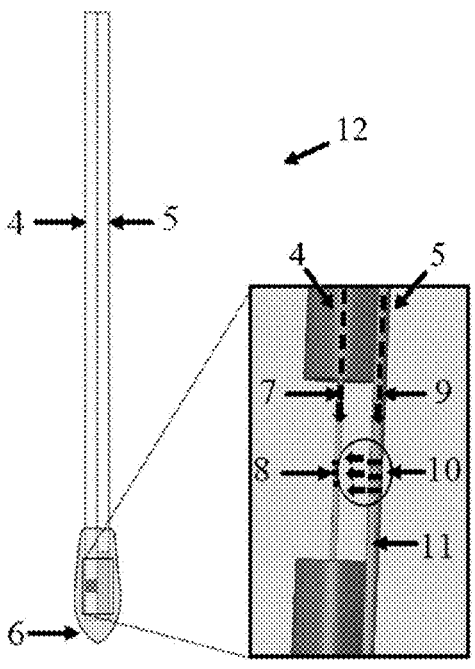
FIG. 1 represents the device for measuring thermal conductivity, according to a preferred embodiment of the present invention.

FIG. 1 presents the device for measuring thermal conductivity 12, according to a preferred embodiment of the present invention.

According to FIG. 1, the device for measuring thermal conductivity 12 comprises at least two fiber optics 4, 5, and at least one encapsulation 6.

With respect to the first fiber optic 4, this is preferably a single-mode fiber optic, which can be pure silica or doped silica.

In addition, the first fiber optic 4 comprises at least one section 8 that is preferably positioned at the lower end of the first fiber optic 4. Particularly, at least one section 8 is a section with an etched Bragg grating 8.

More specifically, the first fiber optic 4 is configured as a temperature measurement sensor.

With respect to the second fiber optic 5, this is preferably a single-mode fiber optic, which can be pure silica or doped silica.

Furthermore, the second fiber optic 5 comprises at least one section 11 that is preferably positioned at the lower end of the second fiber optic 5. Particularly, at least one section 11 is a section doped with calcium oxide nanoparticles 11. More particularly, according to a preferred embodiment of the present invention, at least one section doped with calcium oxide nanoparticles 11 is preferably approximately 4 cm in length.

More specifically, the second fiber optic 5 is configured as a thermal conductivity measurement sensor.

According to a preferred embodiment of the present invention, the first fiber optic 4 and the second fiber optic 5 are preferably positioned side by side.

With regard to encapsulation 6, this comprises at least a mixture of resin and thermal paste, in which its composition is preferably composed of approximately 70% UV curing resin and approximately 30% thermal paste.

In addition, the encapsulation 6 is preferably positioned at the lower end of the first fiber optic 4 and at the lower end of the second fiber optic 5.

Specifically, encapsulation 6 involves at least one section doped with calcium oxide nanoparticles 11 and at least one section with an etched Bragg grating 8. In this way, at least one encapsulation 6 is responsible for conducting and increasing a heat flux 10 reaching at least one section with an etched Bragg grating 8 of the first fiber optic 4.

Figure 2:
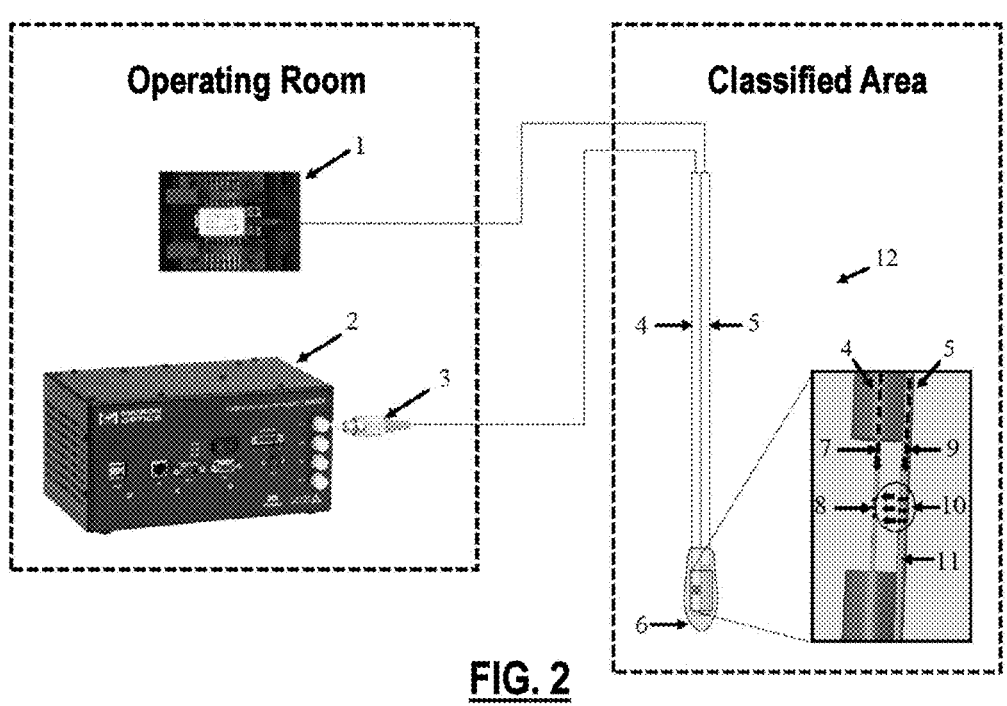
FIG. 2 illustrates the device for measuring thermal conductivity inserted in a classified area, according to a preferred embodiment of the present invention.

FIG. 2 illustrates the device for measuring thermal conductivity 12 inserted in a classified area, according to a preferred embodiment of the present invention.

Further, FIG. 2 represents a system comprising the device for measuring thermal conductivity 12, which is inserted in a classified area, as well as the components of the operating room of said system, according to a preferred exemplary embodiment of application of the device of the present invention.

According to the example shown in FIG. 2, the operating room comprises at least one pumping laser 1, at least one optical interrogator 2, and at least one optical connector 3.

The optical interrogator 2 is preferably a FBG interrogator 2. In particular, as shown in FIG. 2, the FBG interrogator 2 is of the sm125 model (Micron Optics, USA).

Furthermore, the pumping laser 1 is preferably powered by 300 mA.

The optical connector 3 performs the connection interface between the at least one optical interrogator 2 and the first fiber optic 4.

Complementarily, at least one pumping laser 1 is connected to the second fiber optic 5.

In addition, the first fiber optic 4 is configured as a temperature measurement sensor, wherein such a temperature measurement is performed from at least one section with an etched Bragg grating 8, wherein the Bragg grating is characterized by periodic disturbances suffered in the refractive index of the fiber optic core.

Furthermore, according to a preferred embodiment of the present invention, the first fiber optic 4 is fed by at least one first optical signal 7, which is generated by at least one optical interrogator 2. This optical signal 7 is preferably centered at 1550 nm, and runs through the first fiber optic 4 to at least one section with an etched Bragg grating 8.

Therefore, when at least one section with an etched Bragg grating 8 is fed by at least one first optical signal 7, the variation in the refractive index interacts with at least one first optical signal 7, causing refraction of most of at least a first optical signal 7 and reflection of a spectral peak. This peak in the optical spectrum, called the Bragg wavelength, is read through at least one optical interrogator 2, so that the spectral slip of this peak is directly related to the deformation suffered in at least one section with an etched Bragg grating 8. Since deformations in a fiber optic can be caused by both temperature variations and torsion, the Bragg wavelength varies linearly with temperature variation in at least one section with an etched Bragg grating 8.

The second fiber optic 5 is fed by at least one second optical signal 9, which is generated by at least one pumping laser 1. At least one second optical signal 9 is preferably centered at 980 nm, and runs through the second fiber optic 5 until reaching at least one section doped with calcium oxide nanoparticles 11.

According to the results of an exemplary experiment applying the device for measuring thermal conductivity 12 of the present invention, according to a preferred embodiment thereof, it was noted that at least one section of fiber doped with calcium oxide nanoparticles 11 is capable of converting optical power into thermal power, so that the control of the thermal power is carried out by at least one current controller that feeds at least one pumping laser 1.

In this way, the device for measuring thermal conductivity 12 of the present invention, comprising at least one section with an etched Bragg grating 8 of the first fiber optic 4, which acts as a temperature sensor, and at least one section doped with calcium oxide nanoparticles 11 of the second fiber optic 5, which acts as a conductivity sensor, enable the measurement of thermal conductivity in classified areas, from the conversion of optical power into thermal power.

Application Example of the Device for Measuring Thermal Conductivity of the Present Invention The device for measuring thermal conductivity 12 of the present invention was applied, experimentally and by way of example, according to an alternative embodiment thereof, according to the definitions set out below.

With respect to the first fiber optic 4, which comprises the section with an etched Bragg grating 8 and which is configured as a temperature sensor, it is connected to an optical interrogator 2 for reading and storing the lengths of Bragg waves.

The section with an etched Bragg grating 8 and the section doped with calcium oxide nanoparticles 11 are involved by encapsulation 6, which comprises a mixture of resin and thermal paste.

In sequence, the device for measuring thermal conductivity 12 is inserted into a thermostatic bath, model ECO Silver (LAUDA, Germany), with liquid temperature ranging from 20° C. to 50° C. Temperature data are collected by a reference sensor, internal to the thermostatic bath, model LRZ 918 Pt100/LiBus (Lauda-Brinkman, Germany) with 0.02 K resolution.

Figures 3, 4:
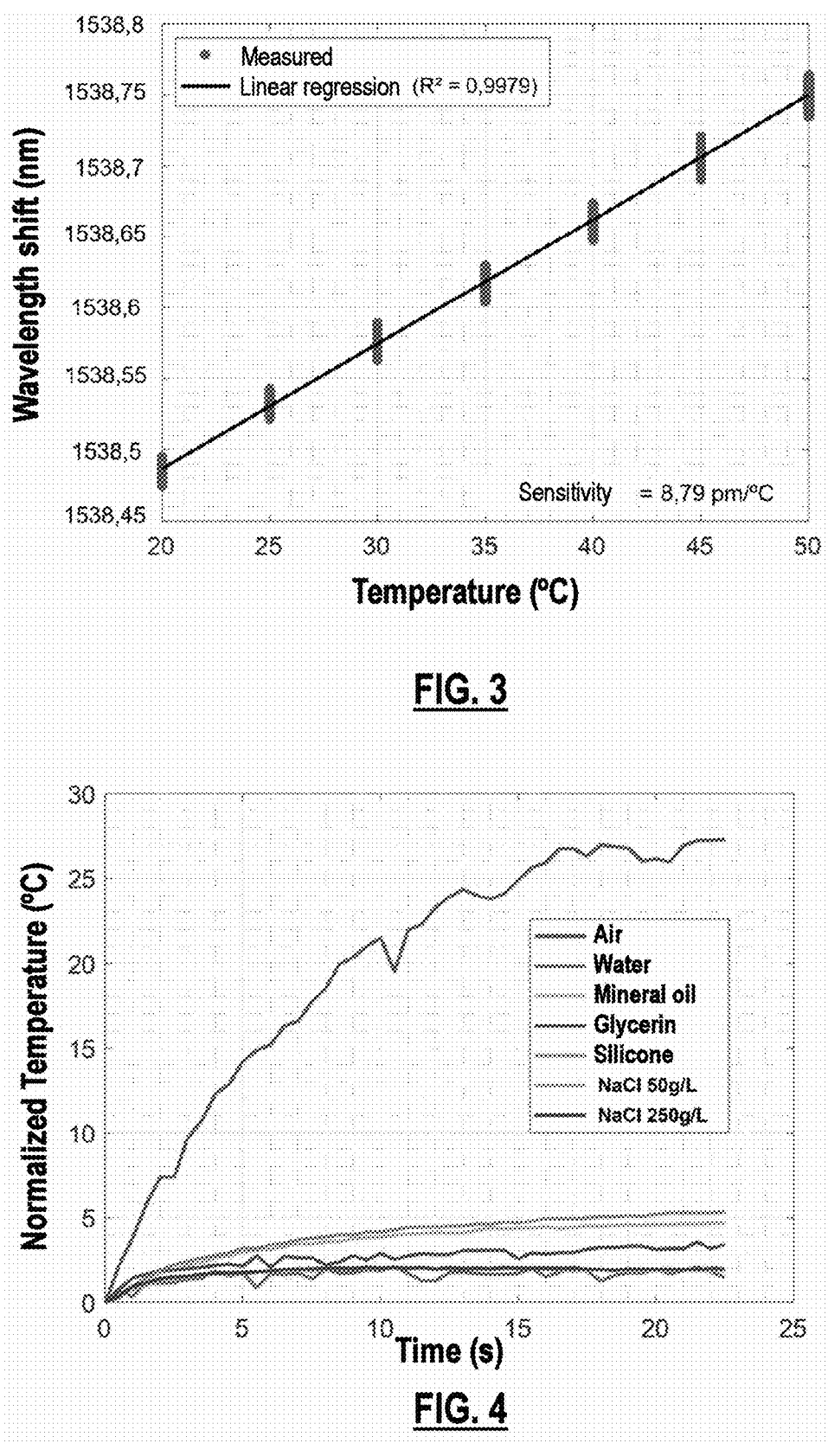
FIG. 3 presents a graph with the results of the temperature data collected in an application example of the device of the present invention, according to a preferred embodiment thereof.
FIG. 4 shows a graph with the temperature versus time curves for samples used in an example of the application of the device of the present invention, according to a preferred embodiment thereof.

FIG. 3 presents a graph with the results of the temperature data collected in an application example of the device 12 of the present invention, according to a preferred embodiment thereof.

More specifically, FIG. 3 presents the curve of the characterization results of the device for measuring thermal conductivity 12, wherein the curve is obtained from a linear regression that relates the Bragg wavelength shift (change of wavelength, in nm) to the temperature measured by the reference sensor (temperature, in ° C.). The result obtained showed that the device for measuring thermal conductivity 12 presented a sensitivity of 8.79 pm/° C.

FIG. 4 shows a graph with the temperature versus time curves for samples used in an example of the application of the device for measuring thermal conductivity 12 of the present invention, according to a preferred embodiment thereof.

Specifically, FIG. 4 shows the curves of temperature (° C.) as a function of time (seconds, s), wherein the temperature is measured with the device for measuring thermal conductivity 12 for samples of air, water, mineral oil, glycerin, silicone oil, and two saline mixtures of concentrations of 50 g/l and 250 g/l of NaCl.

After carrying out the temperature measurements, the slopes of each sample were obtained, and the measured values were applied to the thermal conductivity equation $$k = \frac{Q}{4\pi} \frac{1}{S},$$ (equation (1))

using the hot wire technique.

In equation (1), k is the thermal conductivity of the material in W/m.° C., Q is the thermal power in W inserted by the section doped with calcium oxide nanoparticles 11 in the sample, and S is the slope of the line on the temperature curve as a function of the natural logarithm of time.

The calibration of the device for measuring thermal conductivity 12 was performed using water samples, which have thermal conductivity equal to 0.613 W/m.° C. In this way, equation (1) would become $$k = c * \frac{Q}{S},$$ (equation (2))

where c is the calibration constant.

As can be seen in FIG. 4, since all experiments were carried out in the same time interval and with the same thermal power, as generated by the section doped with calcium oxide nanoparticles 11, the thermal conductivity can be directly related to the inverse of the temperature difference measured by the first fiber optic 4 of the device for measuring thermal conductivity 12. This occurs because fluids with higher thermal conductivities dissipate heat more quickly than fluids with lower thermal conductivity values.

Figures 5, 6:
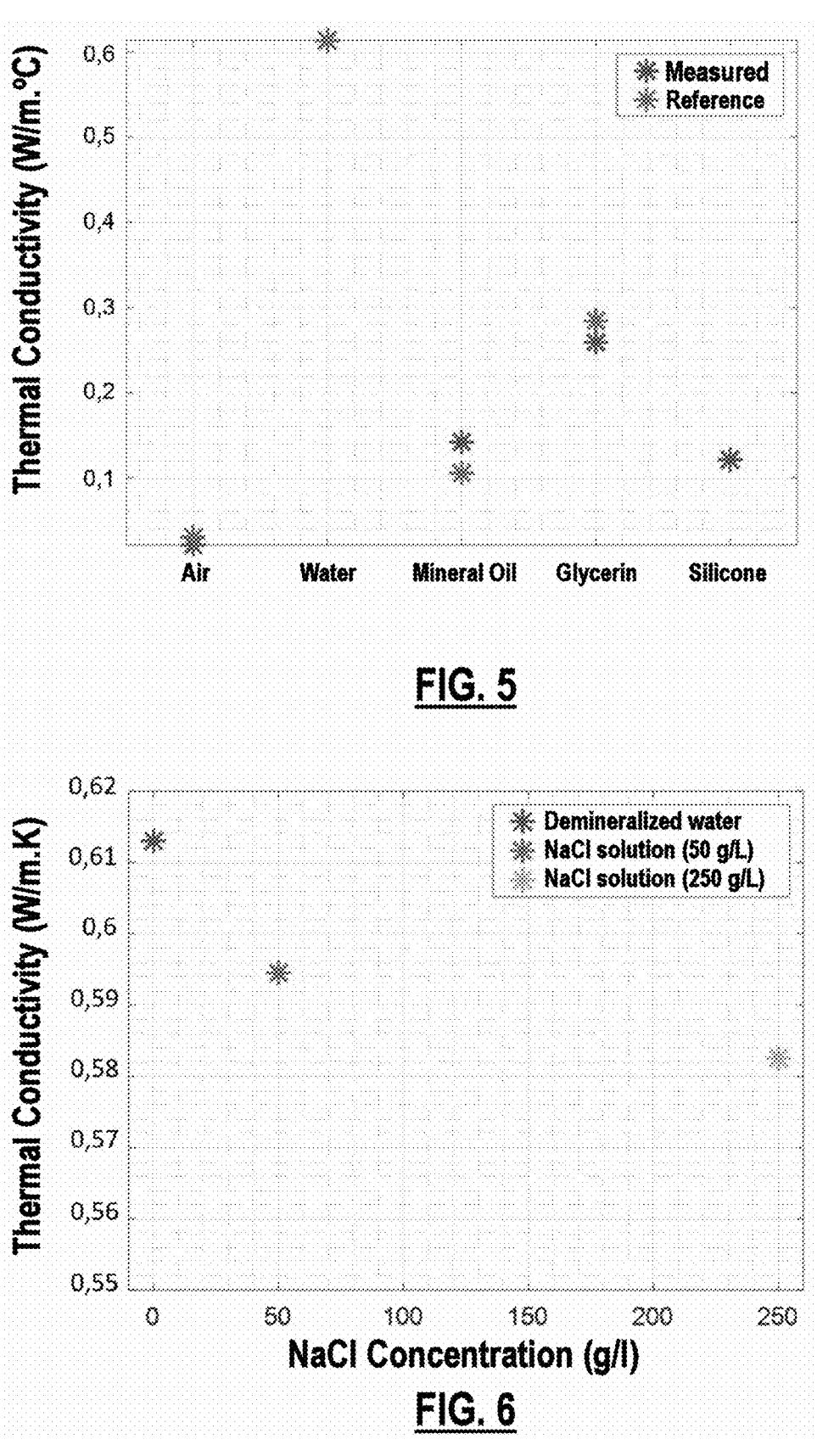
FIG. 5 represents a graph with the measured thermal conductivity values for samples used in an example of the application of the device of the present invention, according to a preferred embodiment thereof.
FIG. 6 shows a graph with the comparison of thermal conductivity values for samples with different salinity concentrations, used in an example of the application of the device of the present invention, according to a preferred embodiment thereof.

FIG. 5 represents a graph with the measured thermal conductivity values for the samples used in an example of the application of the device for measuring thermal conductivity 12 of the present invention, according to a preferred embodiment thereof.

FIG. 5 presents the thermal conductivity values (W/m.° C.) measured by the second fiber optic 5 of the device for measuring thermal conductivity 12 and the reference values of thermal conductivity of samples of air, water, mineral oil and glycerin. It should be noted that the water sample was used in the calibration of the device for measuring thermal conductivity 12.

Additionally, the device for measuring thermal conductivity 12 was applied to estimate the thermal conductivity of a sample of silicone oil, whose conductivity reference value is unknown. The thermal conductivity value for the silicone oil sample found in the experiment using the device for measuring thermal conductivity 12, according to an exemplifying application thereof, was consistent with what was expected, since oil samples have thermal conductivity between 0.1 W/m.° C. and 0.2 W/m.° C.

FIG. 6 in turn shows a graph with the comparison of thermal conductivity values for samples with different salinity concentrations, used in an example of the application of the device for measuring thermal conductivity 12 of the present invention, according to a preferred embodiment thereof.

With respect to FIG. 6, a comparison of thermal conductivity (W/mK) of samples with different concentrations of salinity, NaCl (g/l), was performed. As can be seen from the graph in FIG. 6, the increase in the concentration of NaCl in saline samples generated a reduction in thermal conductivity, which is consistent with experiments already published in the literature, which show that the samples with higher concentrations of NaCl have lower values of thermal conductivity.

Consequently, considering the already known thermal conductivity values, the device for measuring thermal conductivity 12 can be applied, for example, in the task of identifying fluids in a mixture of water, oil and air, according to a preferred embodiment thereof.

Due to the fact that they have different values of thermal conductivity, the measurement in unknown fluids allows identifying, for example, that a fluid with thermal conductivity close to 0.613 W/m.° C. is probably water, fluids with thermal conductivity between 0.1 W/m.° C. and 0.2 W/m.° C. would probably refer to oil, and that fluids with thermal conductivity between 0.01 W/m.° C. and 0.03 W/m.° C. would probably refer to dry air.

It is important to note that the device for measuring thermal conductivity 12 can also be used for characterizing fluids, measuring salinity, or measuring the water-oil interface, according to a preferred embodiment thereof.

Those skilled on the subject will value the knowledge presented herein and will be able to reproduce the invention in the presented embodiments and in other variants, encompassed by the scope of the attached claims.

The invention claimed is:

1. A device for measuring thermal conductivity, the device comprising:

a fiber optic temperature sensor, wherein the fiber optic temperature sensor comprises at least one section with an etched Bragg grating;

a fiber optic thermal conductivity sensor, wherein the fiber optic thermal conductivity sensor comprises at least one section doped with calcium oxide nanoparticles; and at least one encapsulation encompassing the etched Bragg grating and the section doped with calcium oxide nanoparticles.

2. The device of claim 1, wherein the fiber optic temperature sensor and the fiber optic thermal conductivity sensor are single-mode fiber optics comprising one of pure silica or doped silica.

3. The device of claim 1, wherein the fiber optic temperature sensor is positioned adjacent the fiber optic thermal conductivity sensor.

4. The device of claim 1, wherein the etched Bragg grating is positioned at an end of the fiber optic temperature sensor.

5. The device of claim 1, wherein the at least one section doped with calcium oxide nanoparticles is positioned at an end of the second fiber optic.

6. The device of claim 1, wherein the at least one encapsulation is positioned at an end of the fiber optic temperature sensor and at an end of the fiber optic thermal conductivity sensor.

7. The device of claim 1, wherein the at least one encapsulation comprises a mixture comprising 70% UV curing resin and 30% thermal paste.

8. The device of claim 1, wherein the fiber optic temperature sensor is connected to at least one optical interrogator configured to generate at least one first optical signal.

9. The device of claim 8, wherein the at least one first optical signal is centered at 1550 nm.

10. The device of claim 1, wherein the fiber optic thermal conductivity sensor is connected to at least one pumping laser configured to generate at least one optical signal.

11. The device of claim 10, wherein the at least one optical signal is centered at 980 nm.

12. The device of claim 8, wherein the at least one encapsulation is positioned at a first end of the fiber optic temperature sensor and the at least one optical interrogator is connected to a second end of the fiber optic temperature sensor.

13. The device of claim 10, wherein the at least one encapsulation is positioned at a first end of the fiber optic thermal conductivity sensor and the at least one pumping laser is connected to a second end of the fiber optic thermal conductivity sensor.

14. A device for measuring thermal conductivity, the device comprising:

a fiber optic temperature sensor, wherein the fiber optic temperature sensor comprises at least one section with an etched Bragg grating;

a fiber optic thermal conductivity sensor, wherein the fiber optic thermal conductivity sensor comprises at least one section doped with calcium oxide nanoparticles; and at least one encapsulation encompassing the etched Bragg grating and the section doped with calcium oxide nanoparticles; and wherein the fiber optic thermal conductivity sensor is connected to at least one 300 mA pumping laser configured to generate at least one optical signal.

* * * * *